3,296,276
NOVEL 1-OXO-3-PHENYL ISOINDOLINES
Margaret H. Sherlock, Bloomfield, N.J., assignor to Schering Corporation, Bloomfield, N.J., a corporation of New Jersey
No Drawing. Filed July 15, 1964, Ser. No. 382,943
9 Claims. (Cl. 260—325)

This invention relates to novel compositions of matter-classified in the art of chemistry as substituted 1-oxo-isoindolines and to process for making and using such compositions.

The invention sought to be patented, in its composition aspect, is described as residing in the concept of a chemical compound having a molecular structure of a 1-oxo-3-phenylisoindoline characterized by a di-lower alkyl amino (or its hereinafter disclosed equivalents) lower alkylene group attached to the 3-position and having a member of the group consisting of hydrogen and lower alkyl at the 2-position and further characterized in that at least two carbon atoms separate the di-lower alkyl amino moiety from the carbon atom at the 3-position of the iso-indoline nucleus.

Included within the purview of the above-1-oxo-3-phenylisoindolines are the pharmaceutically acceptable acid addition salts such as those formed from inorganic acids such as hydrohalic acids (e.g. hydrochloric and hydrobromic) sulfuric acid, and phosphoric acid, and organic acids, such as tartaric, citric, maleic and succinic acids. The term "lower alkyl" is meant to include those straight and branched-chain saturated lower-aliphatic hydrocarbyls among which are, for purposes of illustration but without limiting the generality of the foregoing, methyl, ethyl, propyl, isopropyl, n-butyl, t-butyl, iso-amyl and the cyclized lower alkyl radicals cyclopropyl, cyclobutyl, and cyclopentyl. The term "lower alkylene" is meant to include those divalent moieties separating the amino group from the 3-position carbon atom by at least two carbon atoms such as ethylene, propylene, butylene, 2-methyl-1,3-propylene, cyclohexylene, β-phenylpropylene and the like.

As is well known in the art, certain substitutions can be made on a phenyl ring or a benzenoid moiety of a complex molecule which do not appreciably alter the therapeutic profile of the compounds, but, however, may slightly alter the relative potency thereof. These such substituted compounds are considered to be equivalents of the so-unsubstituted compounds and, as such, are included within the purview of this invention. Such compounds are those wherein the 3-position phenyl or the benzenoid moiety of the iso-indolines are substituted by halogen (preferably chloro and bromo), trifluoromethyl, lower alkyl (preferably methyl and ethyl), hydroxy and lower alkoxy (preferably methoxy and ethoxy), as well as those compounds wherein the benzenoid moiety contains a plurality of halogens such as when the benzenoid moiety contains a chloro substituent at each of the 4, 5, 6 and 7 positions.

The tangible embodiments of this invention are therapeutically active compounds which in their effect upon the central nervous system produce increased wakefulness and vigilance without locomotor stimulation or the untoward autonomic side effects produced by amphetamine-like drugs. Thus they are useful as mild stimulants, particularly being suitable wherein it is desired to improve alertness and awareness without unduly increasing locomotor activity. It is preferred to administer the compounds of this invention in individual doses of from 0.5 to 1.5 mg./kg. of body weight b.i.d. or t.i.d. for the preferred compounds, but higher doses up to about 3.0 mg./kg. may be effective for those less potent compositions.

Preferably, the tangible embodiments of this invention, in the form of their acid addition salts, may be used in the form of pharmaceutical preparations which contain the active ingredient in admixture with a pharmaceutical carrier suitable for enteral or parenteral administration. Such preparations may be in solid forms, as, for example, tablets, capsules and suppositories, or in liquid forms, as for example, elixirs, emulsions and injectables.

In the formulation of pharmaceutical preparations there may be employed such substances which do not react with the active ingredients, for example, water, gelatin, lactose, starches, magnesium stearate, calcium carbonate, talc, vegetable oils, benzyl alcohols, gums, polyalkylene glycols and petroleum jelly.

The active ingredient is preferably present in the preparation in such proportions by weight that the active ingredient in the formulation to be administered lies between 0.1% and 50%.

The manner and process of making the tangible embodiments of the invention will now be generally described so as to enable a person skilled in the art of chemistry to make and use the same. The general methods of preparation are illustrated by the following equations in the preparation of 1-oxo-2-methyl-3-phenyl-3-γ-dimethylaminopropyl)-isoindoline:

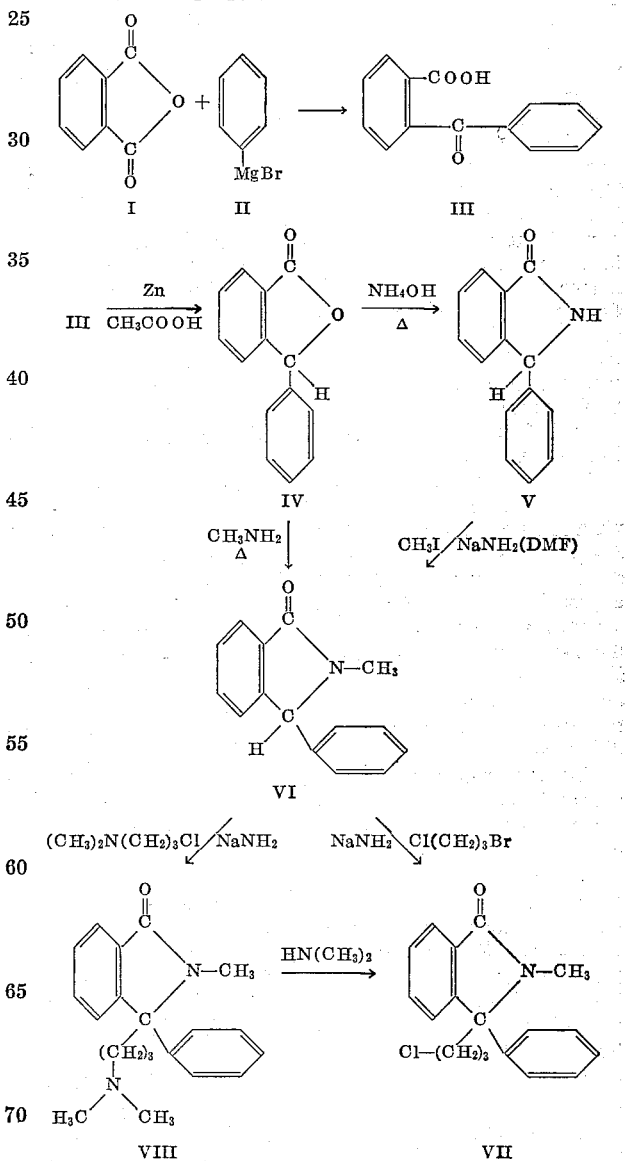

In accordance with the first step in the preparation of the therapeutically active compounds of this invention (illustrated at I+II→III) a benzoyl benzoic acid is formed by the reaction of an appropriate phthalic anhydride with an organo-magnesium halide. This reaction is carried out in an anhydrous solvent inert to the organo-magnesium halide reactant such as ether, benzene, tetrahydrofuran and the like, at temperatures ranging from room temperature to about the reflux temperature of the reaction mixture according to techniques well known for Grignard-type reactions.

The second step in the process (illustrated as III→IV) is a reduction-intramolecular condensation reaction wherein the carbonyl function of the benzoyl moiety of the benzoyl benzoic acid is first reduced to a carbinol function and the resulting compound is dehydrated to form a phenylphthalide (illustrated as IV). This reduction-condensation reaction is preferably carried out with zinc in the presence of glacial acetic acid at about the reflux temperature of the reaction mixture, but other reducing systems, well known in the art may similarly be employed.

The 3-phenyl-phthalides produced by the foregoing reactions are transformed into 1-oxo-3-phenyl-isoindolines by either of alternate procedures the choice being dependent upon such factors as the ready availability of the reactants required, the ancillary uses to which the intermediates may be put, and the like. According to one procedure (illustrated as IV→V) a 3-phenyl-phthalide is caused to react by heating the phthalide at 150°–160° C. with 28% ammonium hydroxide until a substantial amount of the phthalide is transformed to the desired isoindoline. Following this reaction the intermediary isoindoline is condensed with an alkyl halide to form a 1-oxo-2-alkyl-3-phenyl-isoindoline (illustrated as V→VII). This procedure constitutes the condensation of an organic halide (preferably iodide, chloride, or bromide) with the 1-oxo-3-phenyl-isoindoline. The reaction is carried out in an inert solvent such as toluene, dimethylformamide, xylene and the like, preferably at reflux temperature of the reaction mixture, and in the presence of an alkali metal salt such as potassium amide or sodamide. Representative of the halides which may be used on this reaction are methyl iodide, ethyl cholride and the like. The condensation reaction mixture is decomposed with water and the desired 1-oxo-2-alkyl-3-phenyl-isoindoline products are isolated and purified by conventional techniques.

Alternatively the 1 - oxo - 2 - alkyl - 3 - phenyl - isoindolines may be prepared from the 3 - phenyl - phthalides via a one step process (illustrated as IV→VI) wherein the 3 - phenyl - phthalide is heated, preferably under pressure, at temperatures of about 190°–200° C., with the appropriate alkyl amine. Of course, if it is desired to produce a compound having a hydroxyalkyl radical at the 2 - position (e.g. 1 - oxo - 2 - hydroxyethly - 3 - phenyl-isoindoline), the appropriate alkanolamine (e.g. ethanolamine) would be substituted for the alkyl amine and the reaction would then be performed under anhydrous conditions according to techniques well known in the art.

The final products of this invention are prepared by conventional condensation techniques, such as for example a direct alkylation in the presence of a basic condensing agent (illustrated at VI→VIII). As indicated above for other alkylations, the reaction constitutes the condensation of an organic halide with a 1 - oxo - 3 - phenyl - isoindoline. The reaction is carried out in liquid ammonia in the presence of potassium amide or sodamide preferably at reflux temperature. Representative of the halides which may be used are dimethylaminopropyl chloride, dimethylaminoethyl chloride and the like. In those instances wherein it is desired to prepare a 1 - oxo - 3 - phenyl - isoindoline having a primary or secondary amine attached to the lower alkylene moiety at the 3-position of the isoindoline nucleus, (e.g. 1 - oxo - 2 - methyl-3 phenyl - 3 - (γ - aminopropyl) - isoindoline, 1 - oxo - 2 - methyl - 3 - (γ - methylaminopropyl) - isoindoline, respectively) it is preferred to replace the N - hydrogen of the amine by an easily removed moiety such as for example benzyl, acyl, or carbobenzoxy. The product so formed will accordingly contain the N - protective group which is easily cleaved under mild conditions such as by weakly alkaline hydrolysis in the case of the use of formyl grouping, or by catalytic hydrogenation in the case of the use of benzyl to regenerate the corresponding amine. After the foregoing alkylation is effected the reaction mixture is decomposed with water and the desired products are isolated and purified by conventional techniques.

Alternatively, depending upon the availability of the necessary reactants, the foregoing condensation reaction may be carried out via a two-step reaction (illustrated as VI→VII→VIII) wherein the isoindoline is first haloalkylated and then the halo - alkylated intermediate reacted with the amine corresponding to that moiety above-identified as Z so as to form the desired therapeutic compound. The alkylation and amination steps are carried out according to techniques well known in the art.

In those instances wherein it is desired to prepare 1-oxo-3 - phenyl - 3 - alkylaminoalkylene - isoindolines having hydrogen attached to the 2-positions, the desired compounds may be prepared from 3 - alkylaminoalkylene-3-phenyl-phthalides by heating the phthalide at 150–200° (under pressure) with 28% ammonium hydroxide until substantial amounts of the phthalide are transformed to the desired isoindoline.

The free bases are usually dissolved in an organic solvent and converted into a stable acid addition salt by reacting the solution with a suitable organic or inorganic acid.

The procedures contemplated by the inventor for preparing the tangible embodiments of this invention will now be set forth by the following specific illustrations. These examples merely illustrate the particular step exemplified and are not intended to limit the scope of this invention; the scope of this invention being apparent from the entire application.

A.—*Preparation of benzoyl benzoic acids*

EXAMPLE 1.—2-(3-TRIFLUOROMETHYLBENZOYL)-BENZOIC ACID

Heat at reflux temperature a mixture of 54 g. of m-bromobenzotrifluoride and 6.1 g. of magnesium turnings in 150 ml. of anhydrous ether for one hour. Add the so-prepared Grignard reagent to a stirred suspension of 31 g. of phthalic anhydride in a mixture of 150 ml. of benzene and 50 ml. of dry ether over a period of ½ hour with ice bath cooling. Heat the resulting mixture to reflux temperature for ½ hour and allow the heated mixture to stand for 16 hours. Cool the mixture, add crushed ice and 20 ml. of concentrated hydrochloric acid. Steam-distill off the benzene and ether solvents, filter the residue to obtain crude 2 - (3 - trifluoromethylbenzoyl) - benzoic acid. Dissolve the crude product in a 5% sodium bicarbonate solution, filter, acidify the filtrate with hydrochloric acid and recrystallize the resulting precipitate from benzene to obtain 2 - (3 - trifluoromethylbenzoyl) - benzoic acid, M.P. 165–166° C.

By replacing the above m-bromobenzenetrifluoride and phthalic anhydride reactants with the equivalent quantities of the appropriate substituted phenylhalide and substituted phthalic anhydride, respectively, there may also be produced the following benzoic acids:

2-benzoyl-3,4,5,6-tetrachlorobenzoic acid,
2-(2-trifluoromethylbenzoyl)-3-chlorobenzoic acid,
2-(4-methylbenzoyl)-4,5-dimethylbenzoic acid,
2-(2,3-dichlorobenzoyl)-benzoic acid,
2-(4-methoxybenzoyl)-benzoic acid,
2-(4-chlorobenzoyl)-4,5-dichlorobenzoic acid,
2-(4-bromobenzoyl)-4,5-dibromobenzoic acid,
2-(3-trifluoromethylbenzoyl)-4-trifluoromethylbenzoic acid, 2-benzoyl-4-methyl-5-ethylbenzoic acid,
2-benzoyl-4,5-diethylbenzoic acid,
2-(4-chlorobenzoyl)-4,5-diethylbenzoic acid,
2-(4-chlorobenzoyl)-4-ethoxybenzoic acid, and
2-(3-isopropylbenzoyl)-4-methoxybenzoic acid.

B. Preparation of phthalides

EXAMPLE 2.—3-(4-ISOPROPYLPHENYL)-PHTHALIDE

Heat at reflux temperature a reaction mixture containing 30 gm. of 2-(4-isopropylbenzoyl)-benzoic acid, 20 gm. of glacial acetic acid, 51 gm. of zinc and 51 gm. of water for three hours. Decant the supernatant liquid and wash the mixture with acetic acid. Dilute the decanted solution with water to obtain a solid precipitate. Flter the precipitate and recrystallize the crude 3-(4-isopropylphenyl)-phthalide from ispropoyl acetate/hexane mixture.

By replacing the above 2-(4-isopropylbenzoyl)-benzoic acid with equivalent quantities of those benzoyl-benzoic acids listed below Example 1, the following compounds may readily be prepared:

3-phenyl-4,5,6,7-tetrachloro-phthalide,
3-(2-trifluoromethylphenyl)-4-chloro-phthalide,
3-(4-methylphenyl)-5,6-dimethyl-phthalide,
3-(2,3-dichlorophenyl)-phthalide,
3-(4-methoxyphenyl)-phthalide,
3-(4-chlorophenyl)-5,6-dichloro-phthalide,
3-(4-bromophenyl)-5,6-dibromo-phthalide,
3-(3-trifluoromethylphenyl)-5-trifluoromethyl-phthalide,
3-phenyl-5-methyl-6-ethyl-phthalide,
3-phenyl-5,6-diethyl-phthalide,
3-(4-chlorophenyl)-5,6-diethyl-phthalide,
3-(4-chlorophenyl)-5-ethoxy-phthalide,
3-(3-isopropylphenyl)-5-methoxy-phthalide.

C. Preparation of 1-oxo-3-phenyl-isoindolines

EXAMPLE 3.—1-OXO-5-CHLORO-3-PHENYL-ISOINDOLINE

In a sealed vessel heat a mixture of 14.1 gm. of 5-chloro-3-phenyl-phthalide with 28% ammonium hydroxide previously saturated with ammonia at 0° C. for ten hours at 150°–160° C. Filter and recrystallize the crude solid from acetonitrile to yield 1-oxo-5-chloro-3-phenyl-isoindoline, M.P. 224–226° C.

By replacing the above 5-chloro-3-phenyl-phthalide with equivalent quantities of the phthalides listed in Example 2, and by following substantially the same procedure of this example, the following compounds are prepared:

1-oxo-3-phenyl-4,5,6,7-tetrachloro-isoindoline,
1-oxo-3-(2-trifluoromethylphenyl)-4-chloro-isoindoline,
1-oxo-3-(4-methylphenyl)-5,6-dimethyl-isoindoline,
1-oxo-3-(2,3-dichlorophenyl)-isoindoline,
1-oxo-3-(4-methoxyphenyl)-isoindoline,
1-oxo-3-(4-chlorophenyl)-5,6-dichloro-isoindoline,
1-oxo-3-(4-bromophenyl)-5,6-dibromo-isoindoline,
1-oxo-3-(3-trifluoromethylphenyl)-5-trifluoromethyl-isoindoline,
1-oxo-3-phenyl-5-methyl-6-ethyl-isoindoline,
1-oxo-3-phenyl-5,6-diethyl-isoindoline,
1-oxo-3-(4-chlorophenyl)-5,6-diethyl-isoindoline,
1-oxo-3-(4-chlorophenyl)-4-ethoxy-isoindoline,
1-oxo-3-(3-isopropylphenyl)-5-methoxy-isoindoline.

D. Preparation of 1-oxo-2-alkylated-3-phenyl-isoindolines

Example 4.—1-oxo-2-methyl-3-phenyl-5-chloro-isoindoline

Stir a solution containing sodamide (prepared from 1.03 g. of sodium in 100 ml. of liquid ammonia) and 5.5 g. of 1-oxo-5-chloro-3-phenyl-isoindoline in dry redistilled dimethylformamide for ½ hour at room temperature and then cool the mixture to 0° C. To the cooled mixture add 6 g. of methyliodide, and stir the resulting mixture at room temperature for 18 hours. To the stirred reaction add water, and extract with ether, dry the ether extracts over sodium sulfate, filter and concentrate the dried extracts, dissolve the residual yellow oil in acetonitrile and dilute the resulting solution with water to obtain crude 1-oxo-2-methyl-3-phenyl-5-chloro-isoindoline which upon recrystallization from an acetonitrile/water mixture yields the product of this example having a M.P. 145°–146° C.

By replacing the methyl iodide reactant of the above example with equivalent quantities of other lower alkyl iodides by following substantially the same procedure of this example, there is produced the respective 1-oxo-2-lower alkyl-3-phenyl-5-chloro-isoindoline.

Similarly by replacing the above 1-oxo-5-chloro-3-phenyl-isoindoline with equivalent quantities of those isoindolines listed in Example 3, and by following substantially the same procedure of this example, the following compounds are prepared:

1-oxo-2-methyl-3-phenyl-4,5,6,7-tetrachloro-isoindoline,
1-oxo-2-methyl-3-(2-trifluoromethylphenyl)-4-chloro-isoindoline,
1-oxo-2-methyl-3-(4-methylphenyl)-5,6-dimethyl-isoindoline,
1-oxo-2-methyl-3-(2,3-dichlorophenyl)-isoindoline,
1-oxo-2-methyl-3-(4-methoxyphenyl)-isoindoline,
1-oxo-2-methyl-3-(4-chloro-phenyl)-5,6-dichloro-isoindoline,
1-oxo-2-methyl-3-(4-bromphenyl)-5,6-dibromo-isoindoline,
1-oxo-2-methyl-3-(3-trifluoromethylphenyl)-5-trifluoromethyl-isoindoline,
1-oxo-2-methyl-3-phenyl-5-methyl-6-ethyl-isoindoline,
1-oxo-2-methyl-3-phenyl-5,6-diethyl-isoindoline,
1-oxo-2-methyl-3-(4-chlorophenyl)-5,6-diethyl-isoindoline,
1-oxo-2-methyl-3-(4-chlorophenyl)-4-ethoxy-isoindoline,
1-oxo-2-methyl-3-(3-isopropylphenyl)-5-methoxy-isoindoline.

E. Alternate synthesis for the preparation of 1-oxo-2-alkylated-3-phenyl-isoindolines

EXAMPLE 5.—1-OXO-2-METHYL-3-PHENYL-ISOINDOLINE

Add 22.4 g. of 3-(o-tolyl-phthalide) to 75 ml. of 40% aqueous methylamine and heat the mixture in a sealed vessel at 190°–200° C. for ten hours. Cool and add water to the reaction mixture. Extract the mixture with ether and extract the ether extracts with dilute hydrochloric acid. Dry the ether extract over sodium sulfate. Filter and concentrate to obtain an oil which is distilled at 188° C./2.6 mm./kg. and then recrystallize from hexane to yield 1 - oxo-2-methyl-3-phenyl-isoindoline M.P. 72°–75° C.

F. Preparation of final products

EXAMPLE 6.—1-OXO-2-METHYL-3-PHENYL-3-(β-DIMETHYLAMINOETHYL)-ISOINDOLINE

To a stirred solution of potassium amide (prepared from 2.74 g. of potassium in 300 ml. of liquid ammonia) add 15 g. of 1-oxo-2-methyl-3-phenyl-isoindoline. After stirring for thirty minutes, add 7.65 g. of β-dimethylaminoethyl chloride and stir the reaction mixture for an additional twelve hours. Decompose the reaction mixture with water, extract the oil with ether, extract the ether layer with dilute hydrochloric acid and basify the acidic layer. Separate solid reaction product by filtration, dry and recrystallize the crude from hexane, to obtain 1-oxo-2-methyl-3-phenyl-3-(β-dimethylaminoethyl)-isoindoline, M.P. 140°–142° C.

The free base is converted to the maleate salt in ethyl acetate and melts at 174°–175° C. after recrystallization from ethanol-ether.

By replacing the 1-oxo-2-methyl-3-phenyl-isoindoline of this example with those compounds listed in Example 4 and by following substantially the same procedures set forth above, the following compounds are prepared:

1-oxo-2-methyl-3-phenyl-3-(β-dimethylaminoethyl)-4,5,6,7-tetrachloro-isoindoline,
1-oxo-2-methyl-3-(2-trifluoromethyl-phenyl)-3-(β-dimethylaminoethyl)-4-chloro-isoindoline,
1-oxo-2-methyl-3-(4-methylphenyl)-3-(β-dimethylaminoethyl)5,6-dimethyl-isoindoline,
1-oxo-2-methyl-3-(2,3-dichlorophenyl)-3-(β-dimethylaminoethyl)-isoindoline,
1-oxo-2-methyl-3-(4-methoxyphenyl)-3-(β-dimethylaminoethyl)-isoindoline,
1-oxo-2-methyl-3-(4-chlorophenyl)-3-(β-dimethylaminoethyl)-5,6-dichloro-isoindoline,
1-oxo-2-methyl-3-(4-bromphenyl)-3-(β-dimethylamino-ethyl)-5,6-dibromo-isoindoline,
1-oxo-2-methyl-3-(3-trifluoromethylphenyl)-3-(β-dimethylaminoethyl)-5-trifluoromethyl-isoindoline,
1-oxo-2-methyl-3-phenyl-3-(β-dimethylaminoethyl)-5-methyl-6-ethyl-isoindoline,
1-oxo-2-methyl-3-phenyl-3-(β-dimethylaminoethyl)-5,6-diethyl-isoindoline,
1-oxo-2-methyl-3-(4-chlorophenyl)-3-(β-dimethylaminoethyl)-5,6-diethyl-isoindoline,
1-oxo-2-methyl-3-(4-chlorophenyl)-3-(β-dimethylaminoethyl)-4-ethoxy-isoindoline,
1-oxo-2-methyl-3-(3-isopropylphenyl)-3-(β-dimethylaminoethyl)-5-methoxy-isoindoline.

Additionally by replacing the 1-oxo - 2-methyl - 3-phenyl-isoindoline and the β-dimethylaminoethyl chloride reactants with the appropriate reactants (such as for example 1-oxo-2-hydroxyethyl-3 - phenyl-isoindoline and β-diethylaminoethyl-chloride, respectively), and by substantially following the procedure of this example, there may be prepared the therapeutically active compounds embraced by this invention.

G. *Alternate synthesis of the preparation of final products*

EXAMPLE 7.—1-OXO-2-METHYL-3-PHENYL-3-(γ-DIETHYLAMINOPROPYL)-ISOINDOLINE (A) To a suspension of sodium amide (prepared from 2.6 g. of sodium) and 600 ml. of liquid ammonia, add 23 g. of 1-oxo-2-methyl-3-phenyl-isoindoline. Stir the resulting red solution for 20 minutes. Add 17 g. of 1-bromo-3-chloropropane and permit the ammonia to slowly evaporate. Decompose the reaction mixture with water. Filter and recrystallize the crude solid from ethanol-water to yield 1-oxo-2-methyl-3-phenyl-3-(γ-chloropropyl)-isoindoline, M.P. 106°–107° C.

(B) Heat a mixture of 11.7 g. of 1-oxo-2-methyl-3-phenyl-3-(γ-chloropropyl)-isoindoline and 20 g. of diethylamine on a steam bath for 24 hours. Decompose the reaction mixture with water and extract with ether. Extract the ether extracts with dilute hydrochloric acid, and basify the acid extract. Extract the product with ether. Dry and concentrate the ether extracts and recrystallize the residue from hexane to yield 1-oxo-2-methyl-3-phenyl-3-(γ-diethylaminopropyl)-isoindoline.

H.

EXAMPLE 8.—1-OXO-3-PHENYL-3-(2-DIETHYLAMINO-ETHYL)-ISOINDOLINE

Under an atmosphere of nitrogen, add 210.2 g. of 3-phenyl-phthalide (previously dissolved in a minimum of dry dimethylformamide) to a suspension of 24.01 g. of sodium hydride in 300 ml. of dry dimethylaminoformamide and maintain the temperature of the reaction mixture at about 40–50° C. After formation of the sodio derivative is complete add 138 g. of diethylaminoethyl chloride and the resulting reaction mixture stirred for 20 hours at 25°–30° C. to obtain 3-phenyl-3-(2-dimethylaminoethyl)-phthalide.

In a sealed vessel heat a mixture containing 2.5 g. of 3-(2-diethylaminoethyl)-3-phenyl-phthalide and 75 ml. of concentrated ammonium hydroxide (previously saturated with ammonia at 0° C.) at 190–200° C. for ten hours. Cool and add water to the reaction mixture. Extract the mixture with ether, extract the ether with dilute hydrochloric acid, basify the hydrochloric acid extract, extract with ether and dry the ether extract over sodium sulfate. Filter, evaporate off the ether and recrystallize the desired 1-oxo-3-phenyl-3-(2-diethylaminoethyl)-isoindoline from hexane.

Having described the methods of preparing and using the 1-oxo-3-phenyl-3-di-lower-alkylamino lower alkyl-isoindolines of this invention, it becomes readily apparent to one skilled in the art to substitute the amino function attached to the 3-position lower alkylene moiety with other equivalently functioning radicals and that such other resulting compounds will have equivalent applied use characteristics. Therefore although this application is specifically directed toward 1-oxo-3-phenyl-3-di-lower-alkyl-amino lower alkyl-isoindolines, it is fully contemplated that compounds having amino, monoalkylamino, pyrrolidino, piperidino, morpholino and piperazino including N-loweralkylpiperazino, N - hydroxyalkylene - piperazino and N-alkanoyloxyalkylene-piperazino attached to the 3-position lower alkylene moiety of a 1-oxo-3-phenyl-iso-indoline are equivalents of the claimed compounds of this invention and, as such, are within the scope of this invention. Such equivalent compounds are readily prepared by the methods described hereinabove.

I claim:
1. A compound of the group consisting of 1-oxo-3-di-loweralkylamino lower alkylene isoindolines having the structural formula:

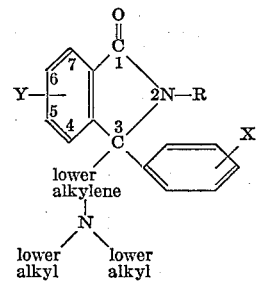

and the non-toxic acid addition salts thereof, wherein said 3-position lower alkylene moiety contains 2–9 carbon atoms, at least two of which separate the di-loweralkylamino moiety from the 3-position carbon atom of the isoindoline nucleus, R is a member of the group consisting of hydrogen, lower alkyl and hydroxy lower alkyl, and X and Y are each members of the group consisting of hydrogen, lower alkyl, halogen, trifluoromethyl, hydroxy, and lower alkoxy.

2. A compound of claim 1 wherein the 3-position lower alkylene moiety contains two carbon atoms.

3. A compound of claim 1 wherein R is hydrogen, X and Y are hydrogen, and the 3-position lower alkylene moiety has two carbon atoms, said compound being named 1-oxo-3-phenyl - 3 - diloweralkyl - aminoethyl iso-indoline.

4. A compound of claim 1 wherein R is hydrogen, X and Y are hydrogen, and the 3-position lower alkylene moiety has three carbon atoms separating the di-loweralkylamino moiety from the 3-position carbon atom of the isoindoline nucleus, said compound being named 1-oxo-3-phenyl-3-diloweralkylaminopropyl-isoindoline.

5. A compound of claim 1 wherein R is hydrogen, X and Y are hydrogen, and the 3-position di-loweralkyl-amino lower alkylene moiety is dimethylaminoethyl, said compound being named 1-oxo-3-phenyl-3(β-dimethylaminoethyl)-isoindoline.

6. A compound of claim 1 wherein R is hydrogen, X is chloro, Y is hydrogen and the 3-position di-loweralkylamino lower alkylene is dimethylaminoethyl, said compound being named 1-oxo-3-(4-chlorophenyl)-3-(β-dimethylaminoethyl)-isoindoline.

7. A compound of claim 1 wherein R is methyl, X is chloro, Y is hydrogen and the 3-position di-loweralkylamino lower alkylene is dimethylaminoethyl, said compound being named 1-oxo-2-methyl-3-(4-chlorophenyl)-3-(β-dimethylaminoethyl)-isoindoline.

8. A compound of claim 1 wherein R is methyl, X and Y are each chloro and the 3-position dilower-alkylamino lower alkylene is dimethylaminoethyl, said compound being named 1-oxo-2-methyl-3-(4-chlorophenyl)-3-(β-dimethylaminoethyl)-5-chloro-isoindoline.

9. A compound of claim 1 wherein R is hydroxyethyl, X and Y are each hydrogen and the 3-position dilower-alkylamino lower alkylene is dimethylaminoethyl, said compound being named 1-oxo-2-hydroxyethyl-3-phenyl-3-(β-dimethylaminoethyl)-isoindoline.

References Cited by the Examiner
UNITED STATES PATENTS 2,759,935   8/1956   Speeter _____ 260—325

ALEX MAZEL, *Primary Examiner.*

HENRY R. JILES, *Examiner.*

M. O'BRIEN, *Assistant Examiner.*